United States Patent [19]

Angus et al.

[11] 3,749,045
[45] July 31, 1973

[54] CONSTANT DEPTH TROLLING DEVICE

[75] Inventors: Charles D. Angus, Spring Lake, Mich.; John C. Angus, Cleveland Heights, Ohio

[73] Assignee: Angus Research Corporation, Spring Lake, Mich.

[22] Filed: Feb. 18, 1971

[21] Appl. No.: 116,381

[52] U.S. Cl. ............................................. 114/235 B
[51] Int. Cl. ............................................. B63b 21/00
[58] Field of Search .................... 114/235 B, 25; 340/3 T

[56] References Cited
UNITED STATES PATENTS
2,709,981 6/1955 Wilcoxon ....................... 114/235 B
2,679,227 5/1954 Symonds ........................ 114/235 B Primary Examiner—Milton Buchler
Assistant Examiner—Stuart M. Goldstein
Attorney—McNenny, Farrington, Pearne & Gordon

[57] ABSTRACT

A device which will dive to a predeterminable depth when towed at normal trolling speeds of from about 2 to about 20 knots through a fluid and which maintains that depth solely as a function of the pressure exerted by the fluid. Pressure-responsive means within a cavity in the body of the device, which means are continuously responsive to fluid pressure, coact with means to provide sufficient torque in a direction orthogonal to the direction in which the device is being towed so as to maintain the device at substantially constant depth.

5 Claims, 4 Drawing Figures

PATENTED JUL 31 1973

INVENTOR.
CHARLES D. ANGUS
JOHN C. ANGUS
BY *McNenny, Farrington,
Pearne & Gordon*
ATTORNEYS

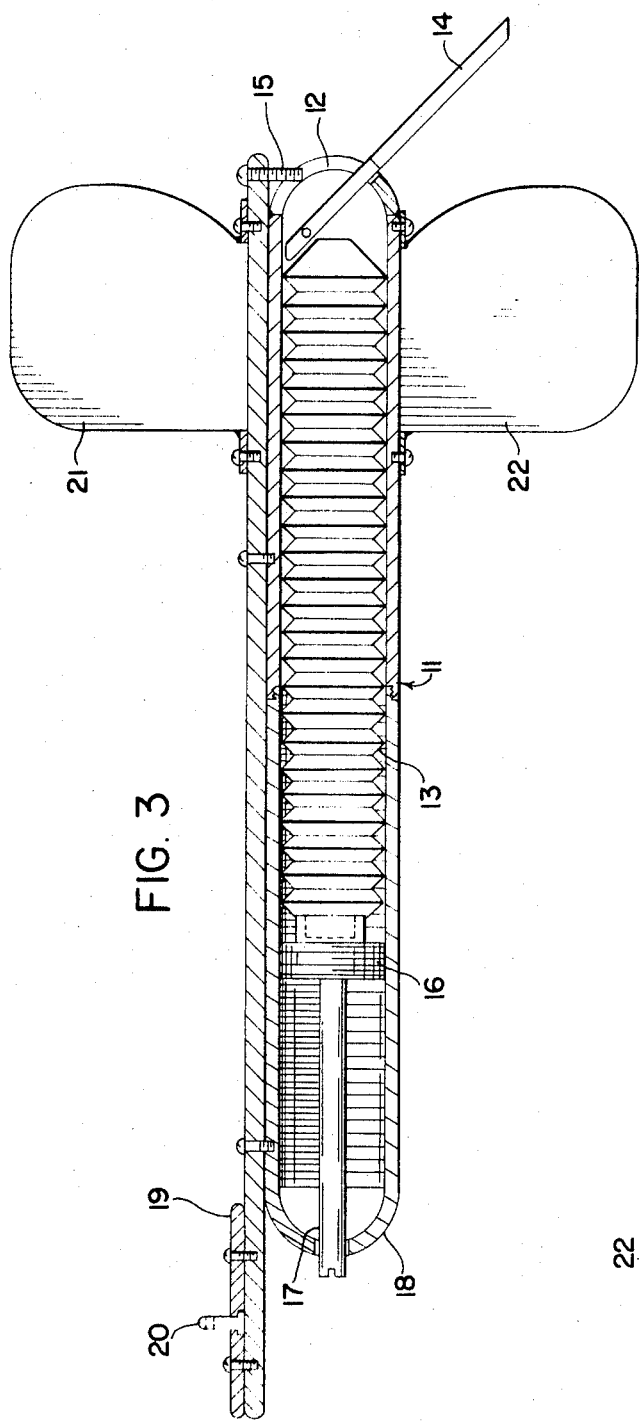
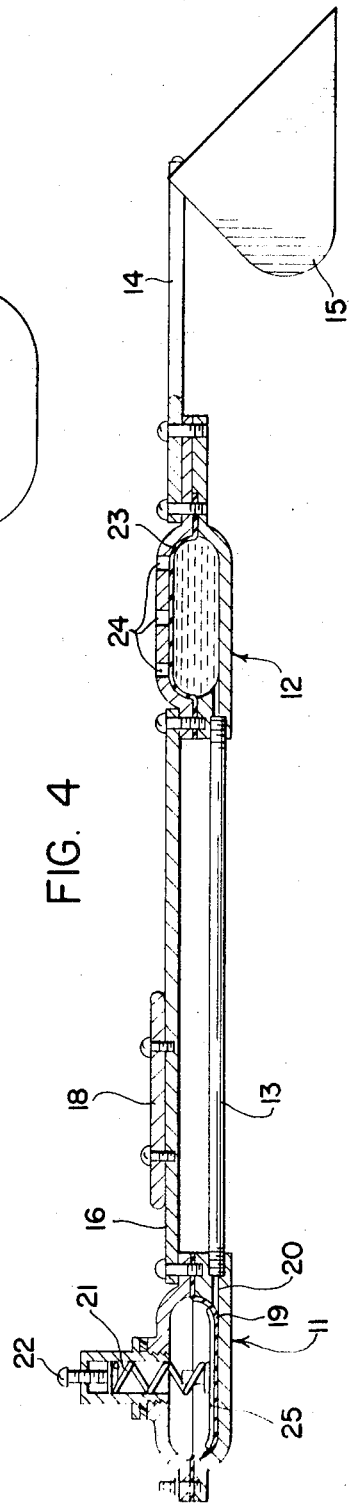
FIG. 3
FIG. 4
INVENTOR.
CHARLES D. ANGUS
JOHN C. ANGUS
BY McNenny, Farrington, Pearne & Gordon
ATTORNEYS

3,749,045

CONSTANT DEPTH TROLLING DEVICE

BACKGROUND OF THE INVENTION

For a number of reasons, it is advantageous and desirable to have a device which will maintain a predetermined depth while it is being towed behind a moving vessel. For example, it is well known that fishermen prefer to fish at specified depths depending upon the kind of fish they are interested in catching and peculiar weather and water temperature conditions which might predicate a particular depth at which fish are most likely to be found. Thus, fishing lures or "leaders" may be attached to the device, or fishhooks may be disposed on the device itself, enabling the fisherman to fish at any depth he preselects. Alternatively, the device may be used to advantage by persons engaged in oceanographic research, where it is desired to obtain a plurality of samples at a specified depth, or where it is desired to monitor a multiplicity of temperatures at a preselected depth. Conventionally, the depth at which the samples or measurements are made is computed by measuring the angle at which a line with specific physical characteristics leaves the boat, the lineal feet of line which have been released, and then by the application of simple trigonometry or more complex calculations for greater accuracy. Because of the variables involved, the accuracy of such a computation leaves something to be desired. The device of the instant invention makes it very simple for a research vessel to obtain several samples simultaneously at different depths, in a single pass, using outriggers and a plurality of lines each with a device pre-set for different depths at which they are to level off, with no need to obtain the line angle readings for each line, thereby greatly decreasing the cost and difficulty of such tests compared to that incurred by conventional methods.

U.S. Pat. No. 2,679,227 discloses a diving device for leading a bathythermograph to a particular depth in a relatively short time, enabling it to record the variation of temperature with depth, and then as soon as it reaches the predetermined depth, it is triggered to ascent to the surface as promptly as it dived to the desired depth. The path of the device is somewhat parabolic, having been reversed as soon as it reached the desired depth, and the device will not maintain essentially level motion at substantially constant depth.

SUMMARY OF THE INVENTION

It has been discovered that a device capable of diving to a preselected depth while it is towed through water behind a moving vessel may be designed to maintain an essentially constant depth independent of boat speed, length of line, water currents, or tidal conditions, the depth at which it is towed being a function solely of the pressure exerted by the ambient fluid.

In the drawings:

FIG. 3 is a longitudinal cross sectional view of an embodiment of the device in which an adjustably compressible bellows is used.

FIG. 4 is a longitudinal cross sectional view of another embodiment of the device in which a heavy fluid is used to bias the device.

Other features of the invention will be best understood and appreciated from the following description of the preferred embodiments referred to hereinbelow.

PREFERRED EMBODIMENTS OF THE INVENTION

Figure 1:
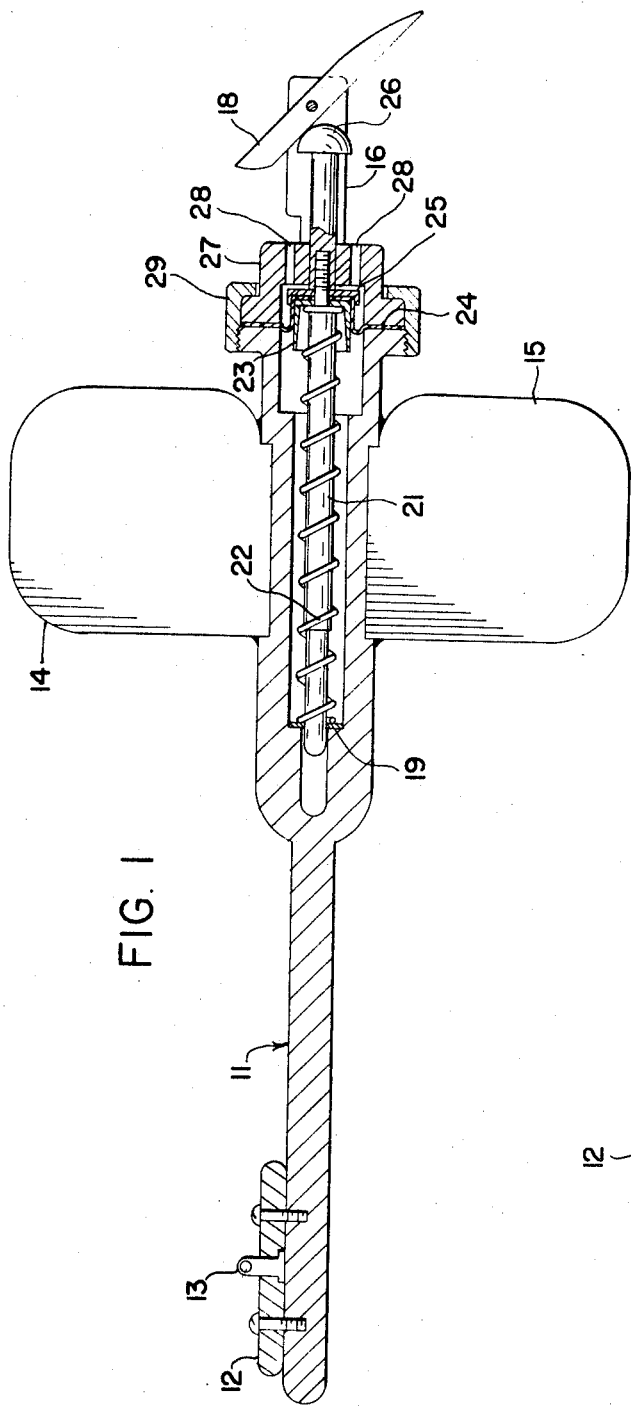
FIG. 1 is a longitudinal cross section of the device in which a spring with a fixed spring constant is removably disposed.
Figure 2:
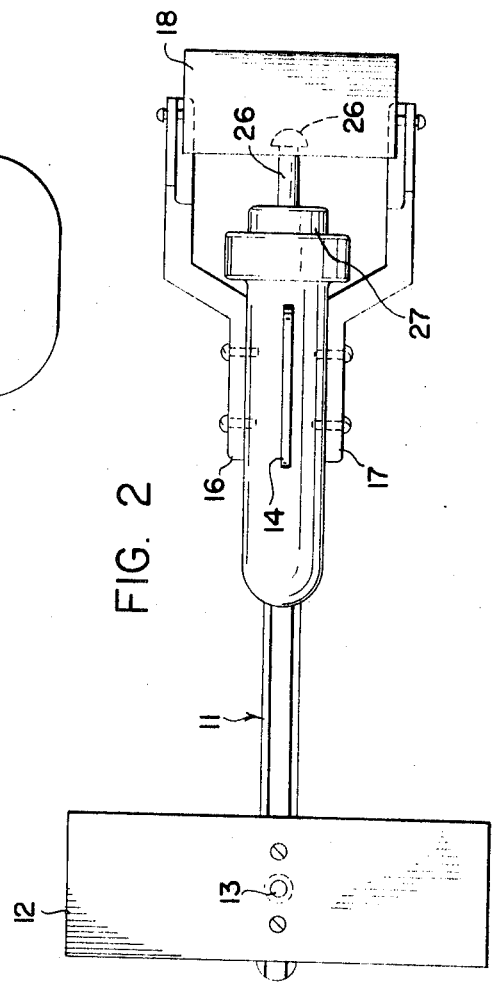
FIG. 2 is a plan view of the device shown in FIG. 1.

Referring now to FIG. 1, the elongated body 11 has a wing 12 fixedly disposed at one end and a towing connection 13 disposed about the center of the wing 12. At the other end of the body are two vertically disposed stabilizing fins 14 and 15 and yoke members 16 and 17, fixedly disposed to the body, which provide a frame in which a vane or tail 18 is pivotably mounted. The vertical stabilizing fins 14 and 15 provide stability by damping yaw. It sometimes is desirable to affix a float on the upper vertical fin 14 and a sinker to the lower vertical fin 15 to accentuate stability. The angle of the vane 18 determines the bias which the device will acquire when it is towed. The body 11 intermediate the stabilizing fins 14 and 15 is provided with an axial cavity closed at the end nearest the towing connection 13 and open at the other end. A shoulder 19 near the closed end provides a seat for a helical spring 22 which encircles the shaft and is accommodated by a piston 23 at the open end of the axial cavity. A rolling diaphragm 24, such as one made by Bellofram Corp., Blanchard Rd., Burlington, Mass., encircles the shaft 21. A curved lip retainer plate 25 holds the rolling diaphragm 24 in place on piston 23. The end of the shaft protruding from the curved lip retainer plate 25 is preferably threaded. Push rod 26 is screwed on to the threaded connection to force the retainer plate 25 against the piston 23, squeezing the rolling diaphragm 24 sufficiently to form a fluid-tight connection. The push rod 26 maintains the vane 18 initially at about a 45-degree angle to the horizontal. A bonnet 27, with ports 28 which permit fluid to exert a pressure on the diaphragm 24, squeezes the diaphragm 24 between the faces of the bonnet 27 and the body 11, forming a fluid-tight fit, because of a bezel ring 29 which is threadedly disposed on the end of the body 11 and clamps the bonnet 27 to the body 11, sandwiching the peripheral portion of the diaphragm 24 therebetween. Alternatively, a plurality of threaded studs may be used between the body 11 and the bonnet 27 to secure the diaphragm 24 in fluid-tight relationship to the axial cavity in the body 11. Again, toggle-type speed clamps may be used for the same purpose, but it is preferred to use a bezel ring 29 as shown.

In operation, the device is cast overboard from a moving vessel and the flow of water acting on the vane 18 causes the aft end of the device to rise and the forward end to dive. The flow of water acting on the surface of the wing 12 causes the device to dive steeply. As greater depths are reached, hydrostatic pressure, acting through the open ports 28 in the bonnet 27 against the diaphragm 24 and the curved lip retainer plate 25, increases. At a preselected depth, depending upon the spring constant and the degree of precompression on the spring, the biasing force of the spring 22 will be overcome and the piston 23 forced to the forward end (or towing end). This action will cause the push rod 26 also to move forward while the force of water rushing against the vane 18 will cause the vane to pivot towards the horizontal axis, decreasing the angle from approximately 45° to approximately 0°. This causes the device to level off and maintain an essentially constant depth at the predetermined depth for which the spring was chosen. While being towed, a tendency for the device to rise to the surface is counteracted because hydrostatic pressure decreases, causing the push rod 26 to protrude further out and against the vane 18, increasing the angle of the vane and causing the device to go deeper. For any given spring strength, a position of stability within a very narrow depth range may be obtained. Removing the spring and interchanging it with one of a different spring constant will permit stability at different depths.

From the above description and the test results to follow, it is evident that a most useful version of the device is one in which a removable, preassembled spring and diaphragm assembly is used. In this manner, several different preassembled spring and diaphragm assemblies can be used with the same body to enable operation at a series of different depths.

TEST RESULTS

The instant device is cast overboard, attached to a wire line marked at 100-foot intervals. Using a wire angle indicator, such as model number 322WA100 made by G. M. Manufacturing Company, one may obtain the angle of the line. Knowing the length of line released and the cosine of the measured angle, one can compute the vertical distance or depth. Use of this technique involves a probable error of plus or minus 7 percent, which is apparent in the date of Tables I, II, III, and IV. Another source of error is the pitching of the boat on the surface waves.

Using two different springs, each 15 inches long and precompressed in the device to a 4-inch length, one spring having a spring constant $k=0.3$ lbs./in., the other with a spring constant of $k=0.5$ lbs./in., the following results were obtained with the boat speed held constant through the test.

TABLE I

| Length of Line | Depth in Feet | |
|---|---|---|
| | $k=.3$ | $k=.5$ |
| 300 ft. | 44 | 83 |
| 300 ft. | 55 | 83 |
| 300 ft. | 58 | 83 |
| | Average-52 | 83 |

It is apparent from the results hereinabove that, for each spring, the device maintains essentially constant depth.

The device, equipped with a 15-inch spring with a spring constant $k=0.3$ lbs./in. and precompressed in the device to a 4-inch length, is towed behind a boat at constant speed but with varying amounts of line paid out. The following results were obtained:

TABLE II

| Length of Line Paid Out | Depth |
|---|---|
| 200 ft. | 55 ft. |
| 300 ft. | 58 ft. |
| 400 ft. | 49 ft. |
| | Average-54 ft. |

It is apparent from the results hereinabove that the device maintains motion in the water at essentially constant depth and is not a function of the length of line paid out.

The same device used in the tests listed in Table II hereinabove was tested at varying boat speeds. The results are as follows:

TABLE III

| length of line paid Out | dpeth in feet at boat speeds | |
|---|---|---|
| | 3.0 knots | 3.8 knots |
| 200 ft. | 55 | 52 |
| 300 ft. | 55 | 43 |
| 400 ft. | 55 | 49 |
| | Average-55 | 48 |

It is apparent from the results hereinabove that the instant device maintains essentially constant depth which is not a function of the boat speed or of the length of line paid out.

In another embodiment of the device depicted in FIG. 3, a cylindrical housing 11, internally threaded at one end and closed at the other except for a slot 12, is fitted with an adjustably compressible bellows 13 which is normally constructed of a flexible plastic material and functions as the spring 22 in FIG. 1. A compressible fluid such as air is sealed within the bellows 13. A vane 14 is pivotally mounted so that it protrudes from the slot 12. In operation, the end of the vane 14 inside the cylinder is in abutting contact with the aft end of the bellows 13. In some cases, for example when operating at great depths, it is desirable to have the bellows abut against a fixed shoulder (not shown) within the cylinder, as well as solely against the vane. A stop 15 is provided to limit the upward movement of the vane 14 to a horizontal position. The forward end of the cylindrical housing 11 is internally threaded and the detent member 16 is threadedly disposed with the internally threaded housing. The stem 17 of the detent member 16 protrudes through an opening in the cylindrical housing 11 and is calibrated to indicate the depth for which the device is set. Alternately, the open forward end of the cylindrical housing 11 (nearest the towing connection 20) may not be threaded but may snugly accommodate a slidable piston which abuts the forward end of the bellows 13 and performs the same function as the detent member 16. A stem may coact with the slidable piston at one end and the other end of the stem would then threadedly protrude through a threaded opening in an end cap, which in turn may be threadedly disposed on the open forward end of said cylindrical housing 11. The stem may be calibrated as described in the preferred embodiment depicted in FIG. 3 or by providing a window in the cylindrical housing 11 so as to visually determine the position of the piston. This is particularly convenient where the cylindrical housing 11 is made from a relatively transparent material. Other equivalent means for providing a predeterminable degree of compression to the bellows 13 will be apparent to those skilled in the art. The preferred embodiment described herein focuses on a particularly desirable means.

Wing means 19 and a towing connection 20 are provided as in the previous embodiment. Similarly, vertical stabilizing fins 21 and 22 are provided to stabilize the yaw of the device. In operation, the water flowing against the fin 14 exerts an upward force on it, biasing the device into a steep dive until sufficient pressure is exerted on the bellows so that it compresses, giving the fin 14 an essentially horizontal attitude which is maintained by its abutting contact with the stop 15.

Another embodiment of the instant invention is shown in FIG. 4, wherein a first strut 16 carries a wing 18 fixedly disposed thereon. On opposite sides of the strut 16 are disposed reservoirs 11 and 12 which are in fluid communication with each other through the conduit 13. Reservoir 11 is at the towing or forward end of the device and reservoir 12 is at the trailing or aft end. Fixedly disposed on the trailing end of the reservoir 12 is a second strut 14 which carries a vane or tail 15 fixedly disposed thereon at a fixed angle in the range from about 10° to about 80°, and more preferably in the range from about 35° to 55° to the horizontal axis of the device. A flexible sealing diaphragm 19 is disposed in the bottom of the reservoir 11, sealing a passage between the reservoir 11 and the conduit 13. A spring means 21, which is adjustably biasable by a screw 22, abuts and pressures the flexible sealing means 19 through a retainer pad 25 which snugly accommodates the lower portion of the spring 21. A sealed fluid, preferably a heavy fluid such as mercury, heavier than the ambient fluid in which the device is to be towed, is poured into the chamber 12 and is contained therein by a flexible diaphragm 23 which isolates the heavy fluid from the ambient fluid. It will be apparent that it is not critical that the sealed fluid be heavier than the ambient fluid for the device to function properly but it will also be apparent that the difficulty of balancing the device with a sealed fluid of the same density as the ambient fluid is substantially greater than that encountered in the use of a heavier fluid. Again, the sealed fluid may be replaced by a fluidizable mass of discrete solid particles, in a size range of from about 1 micron to about 1 mm. in diameter, or a mixture of both, namely, a dispersion of discrete solid particles in a fluid. Thus, a dispersion of heavy discrete solid particles in a relatively light fluid, that is lower in specific gravity than the ambient fluid, would accord the device all the performance advantages of expensive mercury without the economic disadvantages. It is sufficient that the sealed fluid be fluidizable under the conditions encountered at the predetermined depth for which the device is set to operate. Ports 24 in the chamber 12 permit the ambient fluid to exert pressure directly on the flexible diaphragm 23. In operation, the device orients itself with respect to the horizontal, depending upon the balance of forces on the wing 18 and on the fixed angle vane 15, in relation to the position of the center of mass of the device. At atmospheric pressure, the heavy fluid is contained in the chamber 12 and in the conduit 13, and the center of mass along the horizontal axis is behind the point at which the resultant of the hydrodynamic forces acting on the wing may be considered to be exerted. Under this condition, the force of the water acting on the fixed angle tail 15 forces the tail above the horizontal and the wing 18 below the horizontal. The device will dive until the hydrostatic pressure increases to the point at which the force of the spring 21 acting directly against the flexible sealing diaphragm 19 is overcome. When the spring force is overcome by hydrostatic pressure exerted by the ambient fluid against the flexible diaphragm 23, the heavy fluid begins to flow from the chamber 12 into the chamber 11. This causes the center of mass to move forward along the horizontal axis. When the center of mass moves forward of the point at which the hydrostatic forces may be considered to be acting on the wing, the device will rise.

Viewing the device in the horizontal position shown in FIG. 4, the effect of moving the center of mass forward is that the force of water acting on the wing causes a clockwise rotation of the device about the center of mass acting as the fulcrum, instead of the counterclockwise rotation taking place when the center of mass or fulcrum is in the furthest aft position. The force acting on the device due to the attaching of the line decreases the counterclockwise rotation of the device around its center of mass and acts counter to the forces causing the device to dive, but is of itself insufficient to prevent the device from diving.

Although the description of the instant device in the specific embodiments refers to a device operable when towed in water, it will be apparent that, with appropriate modifications readily apparent to one skilled in the art, the device may be used in air, as for example to maintain a plurality of kites at different heights. Having best disclosed our invention and described in detail illustrative embodiments thereof,

We claim:

1. A device towable in a fluid at a predeterminable essentially constant depth, comprising:
  a. a hollow body having a towing connection at one end;
  b. wing means fixedly disposed near said one end;
  c. compressible bellows means slidably disposed within said hollow body and continuously in open fluid pressure communication with said liquid through a slot devoid of valve means for controlling flow of said liquid or affecting the pressure exerted by it, interposed between said slot and said bellows;
  d. adjustable detent means disposed within said hollow body in abutting contact with said bellows means to exert a predeterminable compressive force on said bellows means;
  e. vane means pivotably disposed near the aft end of said hollow body, one end of said vane means being in sliding contact with the aft end of said bellows means and the other end of said vane means protruding from said hollow body, the angle of protrusion of said vane means about a horizontal axis determining the bias said device will acquire when towed; and
  f. stop means disposed near the aft end of said hollow body to prevent said vane means from acquiring a position above the horizontal, enabling said device to maintain essentially constant depth when it is towed.

2. The device of claim 1 wherein said adjustable detent means is a detent member threadedly disposed with said hollow body internally threaded to adjustably accommodate said detent member.

3. The article of claim 2 wherein said detent member is a smooth piston sliding within the smooth hollow body and includes a threaded stem protruding from said hollow body and coating with said detent member to adjustably position it.

4. The device of claim 3 wherein said stem is calibrated to indicate the depth at which said device is preset to operate.

5. The device of claim 1, including vertically disposed stabilizing means near said other end.

* * * * *